United States Patent
Hong

(10) Patent No.: US 7,853,289 B2
(45) Date of Patent: Dec. 14, 2010

(54) MOBILE COMMUNICATION TERMINAL INCLUDING RFID READER AND TRANSCEPTION METHOD THEREOF

(75) Inventor: Seok Jin Hong, Seoul (KR)

(73) Assignee: Pantech Co., Ltd., Seoul (KR)

( * ) Notice: Subject to any disclaimer, the term of this patent is extended or adjusted under 35 U.S.C. 154(b) by 1090 days.

(21) Appl. No.: 11/532,284

(22) Filed: Sep. 15, 2006

(65) Prior Publication Data

US 2007/0066278 A1 Mar. 22, 2007

(30) Foreign Application Priority Data

Sep. 22, 2005 (KR) .................... 10-2005-0088083

(51) Int. Cl.
*H04M 1/00* (2006.01)

(52) U.S. Cl. ............... 455/552.1; 455/41.2; 455/575.7; 340/572.1; 340/572.7

(58) Field of Classification Search ....... 455/41.1–41.3, 455/552.1, 82, 88, 556.1, 59, 62, 73, 101, 455/133, 575.7; 340/10.33, 10.1, 572.1, 340/572.8, 572.4, 572.7
See application file for complete search history.

(56) References Cited

U.S. PATENT DOCUMENTS

| | | | |
|---|---|---|---|
| 6,717,516 B2 * | 4/2004 | Bridgelall | 340/572.1 |
| 7,260,369 B2 * | 8/2007 | Feher | 455/133 |
| 7,477,917 B2 * | 1/2009 | Rofougaran et al. | 455/552.1 |
| 2005/0168340 A1 * | 8/2005 | Mosher et al. | 340/572.8 |
| 2006/0079180 A1 * | 4/2006 | Sinivaara | 455/41.2 |
| 2007/0030124 A1 * | 2/2007 | Lee | 340/10.1 |
| 2007/0069859 A1 * | 3/2007 | Bae et al. | 340/10.1 |
| 2008/0146167 A1 * | 6/2008 | Rofougaran | 455/88 |
| 2008/0309490 A1 * | 12/2008 | Honkanen et al. | 340/572.1 |

* cited by examiner

*Primary Examiner*—Sujatha Sharma
(74) *Attorney, Agent, or Firm*—H.C. Park & Associates, PLC

(57) ABSTRACT

A mobile communication terminal including a Radio Frequency Identification (RFID) reader includes a base band unit for controlling communications, a Radio Frequency (RF) unit for transceiving a signal representing voice and data communications with an external mobile communication terminal, and an RFID unit for transceiving an RFID signal with a RFID transponder in a high frequency band through the RF unit. An RFID RF block may shares components with the RF unit including an antenna, an antenna switch module and a high output amplifier unit to reduce circuit area consumption. The RFID signal may be transceived over a UHF band to increase an operating range of the RFID.

15 Claims, 3 Drawing Sheets

MOBILE COMMUNICATION TERMINAL INCLUDING RFID READER AND TRANSCEPTION METHOD THEREOF

CROSS REFERENCE TO RELATED APPLICATION

This application claims priority from and the benefit of Korean Patent Application No. 10-2005-0088083, filed on Sep. 22, 2005, which is hereby incorporated by reference for all purposes as if fully set forth herein.

BACKGROUND OF THE INVENTION

1. Field of the Invention

The present invention relates to a mobile communication terminal including a Radio Frequency Identification (RFID) reader and a transception method thereof More specifically, the present invention relates to a mobile communication terminal including an RFID reader having a shared antenna for RFID transception and wireless telecommunications transception.

2. Discussion of the Background

Today's mobile communication terminal may perform many various functions, such as wirelessly connecting to the internet, video conferencing, text messaging, and video messaging, in addition to voice communication as information communication technologies continue to develop.

As the digital age continues to mature, mobile communication terminals have developed into high-speed digital information terminals capable of transmitting a high quantity of data at a very high speed. Thus, efforts have been made to form one network over which the terminals may operate. For this network, technologies including wireless local area networks (LANs), Bluetooth, and RFID have been used.

RFID is one technology in the field of automatic recognition technology, which includes bar codes, magnetic sensors and IC-cards or "Smart" cards. RFID includes technology whereby data or information stored in a microchip on an RIFID tag may be read or recognized wirelessly by an RFID reader using RF waves, which may be for example high frequency (HF), very high frequency (VHF), or ultra high frequency (UHF) waves. The RFID tag may be passive, whereby the RFID tag has no independent source of power. These passive RFID tags may draw sufficient power to transmit a signal representing the data stored in the microchip from the RF waves transmitted from the RFID reader. Alternatively, the RFID tag may be active, whereby the RFID tag may include its own source of power for transmitting data to the RFID reader. The RFID tag may be a transponder. Accordingly, upon receiving an RFID signal from the RFID reader, the RFID tag may automatically transmit a signal representing data or information, or a signal including data or information stored in the microchip.

Currently, RFID technology has been widely used in industries instead of the bar code. One advantage of the RFID is that the RFID tag may transmit data stored in the microchip without needing to contact a reader directly or without needing to be visibly scanned by the reader. Rather, the RFID tag may be in the proximity of the reader to transmit the data. The proximity of the RFID tag and RFID reader for successful transmission of data may depend on an operating frequency of the RFID tag and RFID reader. For example, an RFID tag and RFID reader operating in a HF range may be able to transmit data within a range of approximately one meter of the RFID reader.

RFID technology has become popular over internet and LAN technology as a type of automatic recognition technology because the RFID reader and RFID tag may operate outside of a range of a wireless connection to the internet or to an LAN.

As a result of the advantages of the RFID technology, a mobile communication terminal with a built-in RFID reader as described above has been developed.

FIG. 1 shows a block diagram illustrating a conventional mobile communication terminal with a built-in RFID reader. While the conventional mobile communication terminal shown in FIG. 1 will be described as a Global System for Mobile Communication(GSM)-based mobile communication terminal, mobile communication terminals operating according to other wireless protocols, such as Code Divisional Multiple Access (CDMA) or Wideband CDMA (WCDMA), may be similarly arranged.

The conventional mobile communication terminal with a built-in RFID reader may include a GSM base band unit 10, a GSM RF unit 20 controlled by the GSM base band unit 10 for performing transception of voice communication, and an RFID unit 30 with a built-in RFID reader for transception of RFID-based signals. Transception shall mean both transmission and reception of signals, such as voice signals, information signals, data signals, or RFID signals, and shall not be spatially limited to only transmission or only reception at an instant of time.

The GSM RF unit 20 may include an RF transception unit 21, a clock generating unit 22, a filter 23, a high output amplifier unit 24 with a first power amplifier PA1 and a second power amplifier PA2, an antenna switch module 25 and an antenna 26. The RFID unit 30 may include an RFID reader control unit 40, an RFID RF unit 50 and antenna 80.

More specifically, the RFID RF unit 50 may include an RFID transception unit 60, a switch SW1 and an RFID reception unit 70. The switch SW1 may have two positions and may allow the RFID transception unit 60 to transmit a transmission signal from the antenna 80 while the switch SW1 is in a first position, and may allow the RFID reception unit 70 to receive a reception signal at the antenna 80 when the switch SW1 is in a second position. The RFID transception unit 60 may include a modulator 61, a first amplifier AMP1, a second amplifier AMP2, a third power amplifier PA3, a first filter F1, a second filter F2, a power division unit 62 and an attenuation unit 63. The RFID reception unit 70 may include a demodulator 71, a power division unit 72, a low noise amplifier LNA1 and a third filter F3.

The demodulator 71 may include mixer M1 and mixer M2, amplifier AMP3 and amplifier AMP4, filter F4 and filter F5, and amplifier AMP5 and amplifier AMP6. The mixer M1 and mixer M2 may each demodulate a power-divided signal of the power division unit 72 and downconvert the frequency of the power-divided signals. The amplifier AMP3 and amplifier AMP4 may amplify output signals of the mixer M1 and the mixer M2, respectively. The filter F4 and filter F5 may filter output signals of the amplifier AMP3 and amplifier AMP4, respectively. The amplifier AMP5 and amplifier AMP6 may amplify output signals of the filter F4 and filter F5, respectively. The output signals of amplifier AMP5 and amplifier AMP6 may be output to RFID reader control unit 40.

The modulator 61 may modulate a transmission signal and regulate its frequency upward, and the demodulator 71 may demodulate a reception signal and regulate its frequency downward. The transmission signal and the reception signal may each correspond to an operating frequency of the RFID, which may be 13.56 MHz.

The above-described mobile communication terminal with a built-in RFID reader may control the GSM RF unit 20 and the RFID RF unit 50 separately through the GSM base band unit 10. As a result, a circuit may be complicated, thus increasing the manufacturing cost, and the circuit may occupy a large area in the mobile communication terminal. Thus, the size requirements of the circuit may prevent the terminal from being sized smaller according to the prevailing trend in terminal sizes.

Moreover, the RFID unit 30 may not operate properly and may not be recognized when separated from the reader by a distance greater than one meter because the RFID may be configured to operate at an HF frequency, such as 13.56 MHz, which is lower than an operating frequency of the GSM RF Unit 20 since the GSM RF Unit 20 may operate in the UHF band.

SUMMARY OF THE INVENTION

This invention provides a mobile communication terminal including an RFID reader having a shared antenna for RFID transception.

The present invention also provides a transception method for transceiving signals related to the mobile communication terminal and for transceiving signals related to the RFID reader using the shared antenna.

Additional features of the invention will be set forth in the description which follows, and in part will be apparent from the description, or may be learned by practice of the invention.

The present invention discloses a mobile communication terminal including a base band unit for controlling the mobile communication terminal, a radio frequency ("RF") unit coupled with the base band unit and including an antenna, the RF unit for transceiving a first signal in response to a control signal received from the base band unit, the first signal representing voice or data communications, and an RFID unit coupled with the RF unit, the RFID unit for transceiving a second signal with a RFID transponder in response to a control received from the base band unit. Further, the first signal and the second signal are both transceived through the antenna.

The present invention also discloses a method for transceiving an RFID signal of a mobile communication terminal including an RFID reader. The method includes encoding and signal-processing an RFID transmission signal in a low frequency band, upconverting a frequency of the RFID transmission signal, receiving an RFID reception signal in a high frequency band, downconverting a frequency of the RFID reception signal, and decoding and signal-processing the RFID reception signal in a low frequency band.

The present invention also discloses a mobile communication terminal including a base band unit for controlling the mobile communication terminal, a radio frequency ("RF") unit coupled with the base band unit, the RF unit for transceiving a first signal, the RF unit having an antenna, a path selection unit, and an RFID transmission selection unit. The mobile communication terminal also includes an RFID unit comprising an RFID transmission unit and an RFID receiving unit, the RFID unit for transceiving a second signal. Further, an output terminal of the RFID transmission unit is coupled with an input terminal of the RFID transmission selection unit, an input terminal of the RFID receiving unit is coupled with an output terminal of the path selection unit, and the mobile communication terminal transceives the first signal and the second signal using a cellular communication protocol through the antenna.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
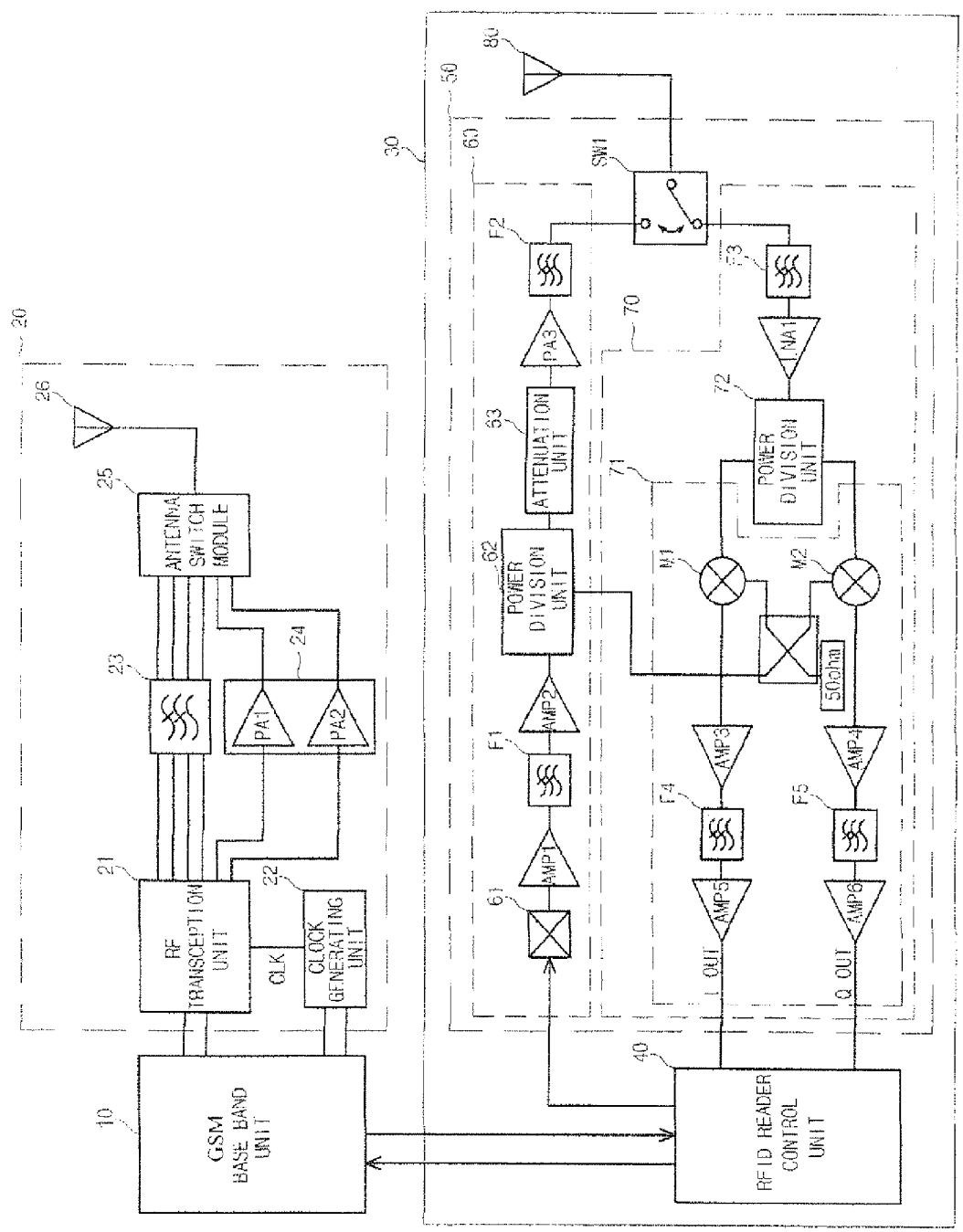
FIG. 1 shows a block diagram illustrating a conventional mobile communication terminal with a built-in RFID reader.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
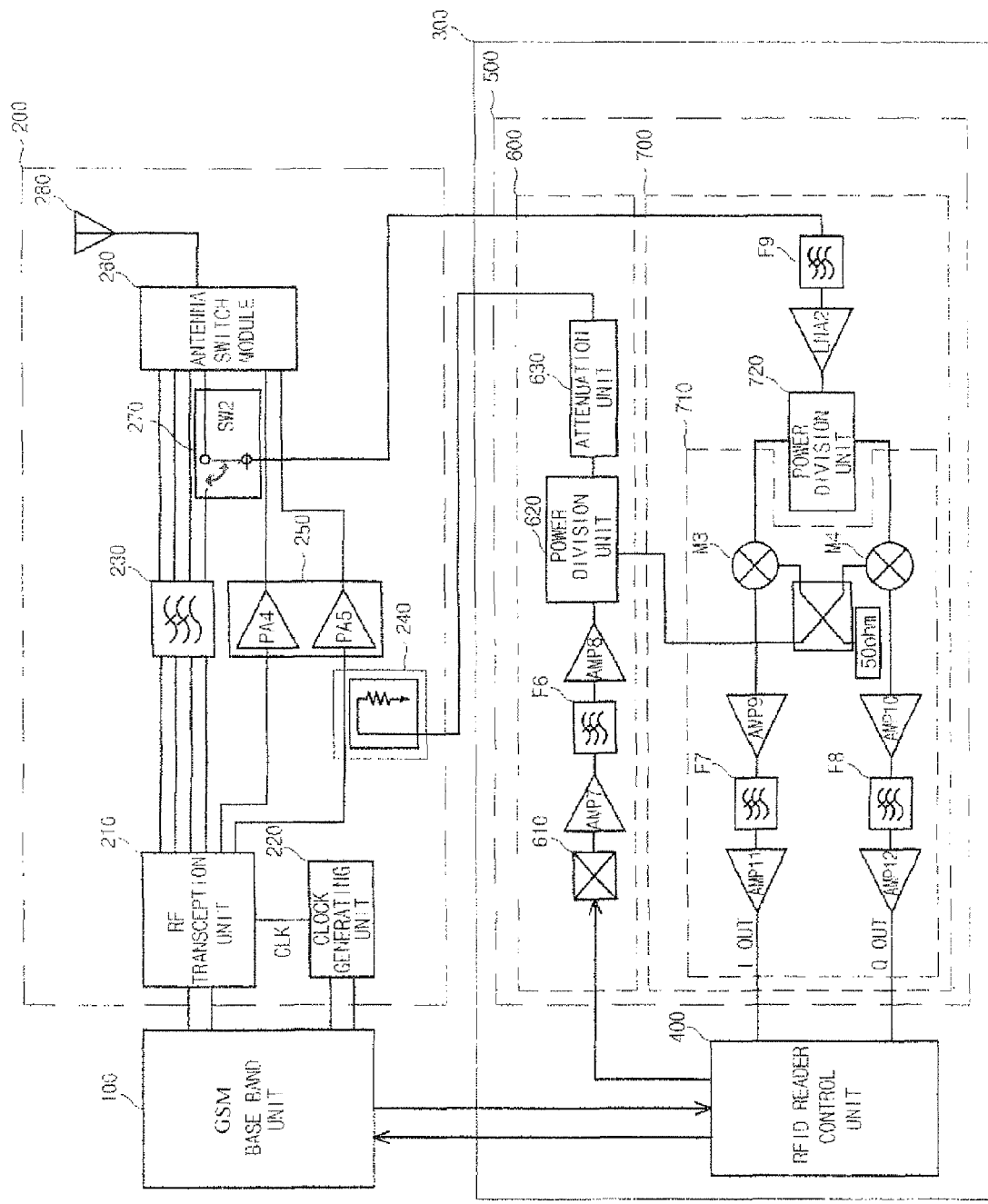
FIG. 2 shows a block diagram illustrating a mobile communication terminal with a built-in RFID reader according to an exemplary embodiment of the present invention.

FIG. 2 shows a block diagram illustrating a mobile communication terminal with a built-in RFID reader according to an exemplary embodiment of the present invention. While the conventional mobile communication terminal shown in FIG. 2 will be described as a GSM-based mobile communication terminal, mobile communication terminals operating with other wireless protocols, such CDMA or W-CDMA, may be similarly arranged, and the invention is not limited thereto.

In this exemplary embodiment, the mobile communication terminal may include a GSM base band unit 100, a GSM RF unit 200 and a RFID unit 300.

The GSM base band unit 100 may transceive a transcpetion signal with the GSM RF block 200 for voice and data communication, and may transceive a transcpetion signal with the RFID unit 300 for RFID communication. The GSM base band unit 100 may also output a control signal to the GSM RF block 200 for controlling the GSM RF block 200, and specifically an RFID transmission selection unit 240 and a path selection unit 270. The GSM base band unit 100 may also output a control signal to the RFID RF unit 500 for controlling the RFID RF unit 500. The GSM base band unit 100 may output control signals through a General Purpose Input/Output (GPIO) device (not shown).

The GSM base band unit 100 may control the GSM RF block 200 and the RFID RF unit 500 to display or transmit data in the mobile communication terminal using information related to a reception signal in voice and data communication through the GSM RF unit 200 and in RFID communication through the RFID unit 300.

The GSM RF unit 200 may include an RF transception unit 210, a clock generating unit 220, a filter 230, the RFID transmission selection unit 240, a high output amplifier unit 250 including two amplifiers PA4 and PA5, the path selection unit 270, an antenna switch module 260 and an antenna 280.

The RF transception unit 210, coupled with the GSM base band unit 100, may apply a reception signal received from the antenna 280 into the GSM base band unit 100.

The clock generating unit 220 may generate a clock signal CLK in response to a command from the GSM base band unit 100 and may apply the clock signal CLK to the RF transception unit 210.

The filter 230 may be a surface acoustic wave (SAW) filter and may filter a signal applied from the antenna switch module 260 to remove noise, and may apply the signal to the RF transception unit 210.

The RFID transmission selection unit 240 may apply a transmission signal outputted from the RFID transmission unit 600 of the RFID unit 500 to an input terminal of the high output amplifier unit 250 when the RFID unit 500 is in a transmission mode.

The RFID transmission selection unit 240 may selectively output the transmission signal of the RFID unit 500 or an output signal of the RF transception unit 210. The RFID transmission selection unit 240 may apply only a transmission signal of the RFID unit 500 to the antenna switch module 260 when the RFID unit 500 is in the transmission mode. When the RFID unit 500 is in a transmission mode, the RF transception unit 210 may be turned off. Alternatively, the RFID transmission selection unit 240 may include a switch to prevent transmission of an output signal of the RF transception unit 210 to the antenna switch module 260 when the RFID unit 500 is in the transmission mode.

The high output amplifier unit 250 including power amplifiers PA4 and PA5 may amplify an output signal of the RF transception unit 210 or an output signal of the RFID transmission selection unit 240. The high output amplifier unit 250 then outputs the amplified signals to the antenna switch module 260.

The power amplifier PA5 may be configured to operate at a first band, such as a band ranging from 824 to 915 MHz, and may be used for amplifying signals in the first band, such as GSM or RFID signals. The power amplifier PA4 may be configured to operate at a second band, such as a band ranging from 1710 to 1910 MHz, and may be used for amplifying signals in the second band, such as a Digital Cellular System (DCS) or a Personal Communication Service (PCS).

The antenna switch module 260, which may include a transmission module for operating in a transmission mode and a reception module for operating in a reception mode, may transmit a transmission signal outputted from the high output amplifier unit 250 to the antenna 280 in the transmission mode. The antenna switch module 260 may also transmit a reception signal received from an external mobile communication terminal (not shown) through the antenna 280 to the filter 230 in a reception mode. The antenna switch module 260 may be configured to transceive signals in a band of about 824 MHz to about 960 MHz and about 1710 MHz to about 1990 MHz.

The path selection unit 270, which may include a switch SW2, may be coupled between the antenna switch module 260 and the filter 230. The path selection unit 270 may control transmission of a reception signal received from the antenna switch module 260 through the antenna 280 into the filter 230 or into the RFID reception unit 700.

More specifically, a first output terminal of the switch SW2 may be coupled with a terminal of the filter 230 in the GSM RF Unit 200. A second output terminal of the switch SW2 may be coupled with an input terminal of the RFID reception unit 700 of the RFID unit 300. Depending on the positioning of the switch SW2, a reception signal from the antenna switch module 260 may be transmitted to the filter 230 when the mobile communication terminal is in a GSM reception mode. Alternatively, a reception signal from the antenna switch module 260 may be transmitted to the RFID reception unit 700 of the RFID unit 500 when the mobile communication terminal is in an RFID reception mode.

Operation of the RFID transmission selection unit 240, the antenna switch module 260 and the path selection unit 270 may be controlled by a control signal outputted from the GSM base band unit 100.

The RFID unit 300 may include an RFID reader control unit 400 and an RFID RF block 500.

The RFID reader control unit 400 may encode a transmission signal received from the GSM base band unit 100, and may convert a digital signal received from the GSM base band unit 100 into an analog signal and apply the analog signal to the RFID transmission unit 600. Then, the RFID reader control unit 400 may receive a reception signal from the RFID reception unit 700, may decode the reception signal, and may converts an analog signal from the RFID reception unit 700 into a digital signal and apply the digital signal to the GSM base band unit 100.

The RFID RF block 500 may include an RFID transmission unit 600 and an RFID reception unit 700.

The RFID transmission unit 600 may include a modulator 610, amplifiers AMP7 and AMP8, a filter F6, a power division unit 620 and an attenuation unit 630.

The modulator 610 may modulate the analog transmission signal, which may be signal-processed by and received from the RFID reader control unit 400, and may upconvert the frequency of the signal to a higher frequency band, such as a UHF band. Upconverting a signal shall include shifting a frequency of a signal from a lower frequency band to a higher frequency band without significantly altering the content of the message, data, or information stored in the signal. The frequency band of the transmission signal may be set within a range of about 860 MHz to about 915 MHz, about 824 MHz to about 960 MHz, and about 1710 MHz to about 1990 MHz.

The amplifier AMP7 may amplify the transmission signal outputted from the modulator 610 to transmit the signal into the filter F6. The filter F6 may filter the transmission signal. Then, the amplifier AMP8 may amplify the transmission signal, and the power division unit 620 may power-divide the transmission signal. The attenuation unit 630 may attenuate a level of the transmission signal and apply the signal into the RFID transmission selection unit 240 of the GSM RF unit 200.

The RFID reception unit 700 may include a demodulator 710, a power-division unit 720, a low noise amplifier LNA2 and a filter F9.

The filter F9 may filter an output signal of the path selection unit 270 when the mobile communication terminal is in an RFID reception mode and a received signal from the antenna switch module 260 is transmitted to the RFID reception unit 700 via switch SW2. The low noise amplifier LNA2 may amplify an output signal of the filter F9, and the power division unit 720 may divide a power level of an output signal of the low noise amplifier LNA2 into two signals with a power-divided power level.

The demodulator 710 may include mixer M3 and mixer M4, amplifier AMP9 and amplifier AMP10, filter F7 and filter F8, and amplifier AMP11 and amplifier AMP12. The mixer M3 and mixer M4 may each receive a power-divided signal of the power division unit 720, may demodulate the signals, and may downconvert the frequency of the signals. Downconverting a signal shall include shifting a frequency of a signal from a higher frequency band to a lower frequency band without significantly altering the content of the message, data, or information stored in the signal. The amplifier AMP9 may amplify the output signal of the mixer M3, filter F7 may filter the output signal of the amplifier AMP9, and the amplifier AMP11 may amplify the output signal of the filter F7. Amplifier AMP10 may amplify the output signal of the mixer M4, filter F8 may filter the output signal of the amplifier AMP10, and amplifier AMP12 may amplify the output signal of the filter F8.

Accordingly, the above-described circuitry may occupy a reduced area in the mobile communication terminal since it does not include the power amplifier PA3, the filter F2, the switching device SW1 and the antenna 80 in the RFID RF unit 50 as shown in FIG. 1.

Also, the modulator 610 may upconvert the frequency band of the RFID transmission signal to be suitable for the GSM base band unit 100, and the demodulator 710 may downconvert the frequency band of the RFID reception signal to be suitable for the GSM base band unit 100. This may allow the mobile communication terminal to perform RFID communication with the RFID transception signal in an operating frequency band, such as a UHF frequency band, of the GSM base band unit 100. The antenna switch module 260, the amplifiers AMP7 and AMP8 and the power amplifier PA5 may be configured to operate at the operating frequency band of the GSM base band unit 100.

Figure 3:
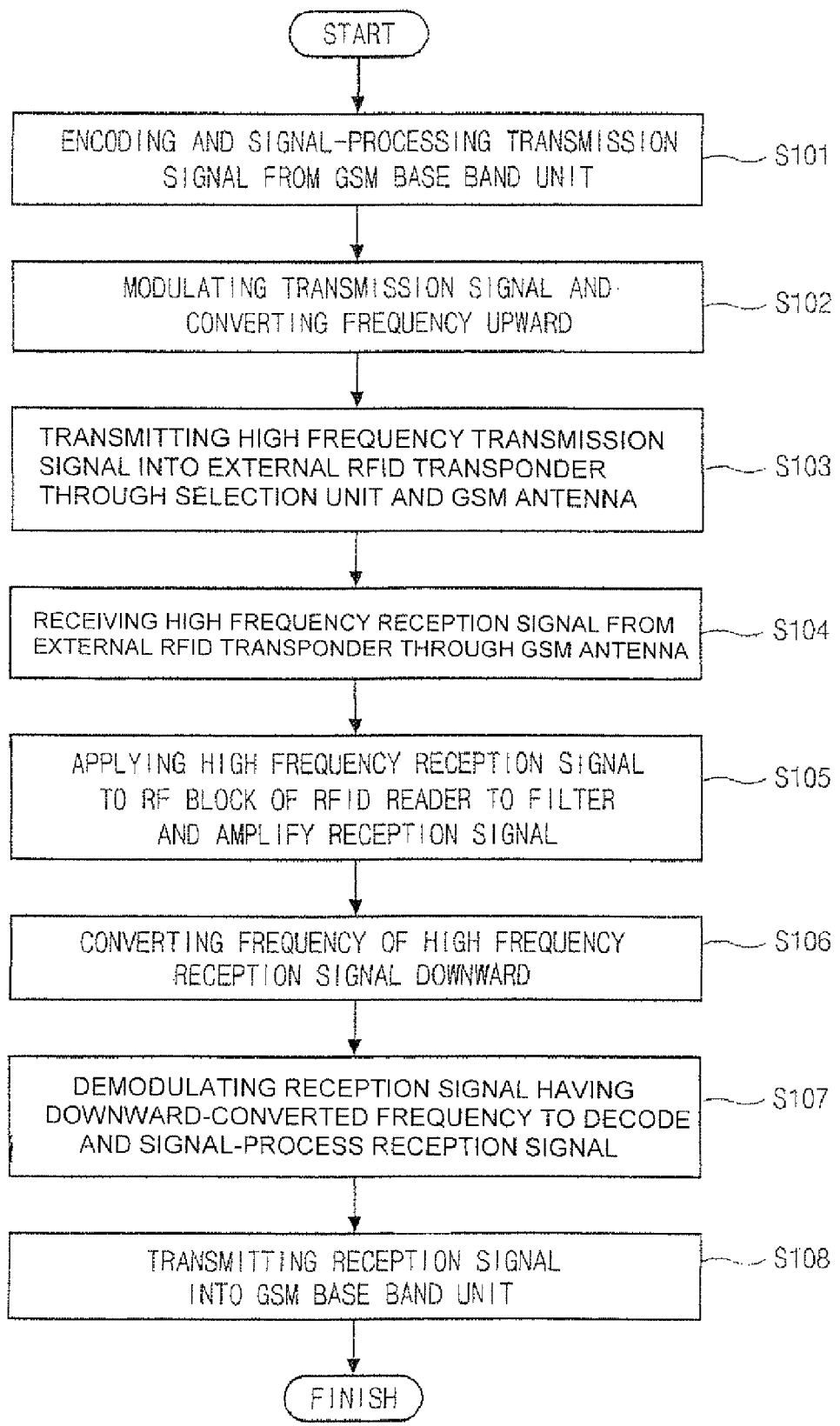
FIG. 3 shows a flow chart illustrating a method for processing a transception signal of a UHF band of the mobile communication terminal with the built-in RFID reader of FIG. 2.

FIG. 3 shows a flow chart illustrating a method for processing a transception signal of the mobile communication terminal with the built-in RFID reader of FIG. 2. While method shown in FIG. 3 is described for a GSM-based mobile communication terminal operating in a UHF frequency band, a similar method for processing transception signals for mobile communication terminals operating with other wireless protocols, such CDMA or W-CDMA, and in other frequency bands may be similarly performed, and the invention is not limited to the illustrated embodiment described herein.

As shown in FIG. 3, in step S101, a transmission signal transmitted from the GSM base band unit 100 may be encoded and signal-processed from a digital transmission signal into an analog signal by the RFID reader control unit 400.

Next, in step S 102, the transmission signal may be modulated and its frequency may be upconverted by the modulator 610. Upconversion may shift the frequency of the transmission signal into an operating frequency of the GSM base band unit 100, which may be the UHF frequency band.

The transmission signal may be amplified and filtered, and then transmitted to the RFID transmission selection unit 240 of the GSM RF unit 200.

Next, in step S103, the transmission signal may be amplified to a high power through the power amplifier PA5, and may be transmitted through the antenna switch module 260 and the antenna 280 to an external RFID transponder (not shown). During step S103, the transmission signal may be further amplified through the power amplifier PA5 so transception of the RFID transmission signal may be communicated at distances exceeding one meter.

Thereafter, in step S 104, the GSM RF block 200 may receives a high frequency reception signal in the UHF band from an external RFID transponder (not shown).

In step S105, the path selection unit 270 may apply the high frequency reception signal received through the antenna 280 to the RFID reception unit 700, which may then filter the signal through the filter F9 and amplify the signal through the low noise amplifier LNA2.

The demodulator 710 may then downconvert the frequency to a lower frequency band in step S106. Specifically, the frequency of the high frequency reception signal may be downconverted to a frequency suitable for the RFID reader control unit 400.

Next, in step S 107, the demodulator 710 may demodulate the high frequency reception signal. The RFID reader control unit 400 may decode the demodulated reception signal, and may signal-process the reception signal to convert the analog reception signal into a digital reception signal. Finally, in step S108, the RFID reader control unit 400 may transmit the digital reception signal into the GSM base band unit 100.

Then, the GSM base band unit 100 may perform additional operations related to information received from the RFID unit 300, such as store the information or transmit the information to a database or computer terminal, where the information may be stored or may update a current status condition or data entry, over a GSM-based network.

As described above, according to an exemplary embodiment of the present invention, an RFID RF block and a GSM RF unit share an antenna, an antenna switch module and a high output amplifier of to minimize circuitry area consumption and cost of manufacturing.

Additionally, RFID transception is performed over a higher operating frequency band of the mobile communication terminal, such as a UHF band for GSM protocols, so that RFID communication may be performed over a longer distance to improve quality of communication.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile communication terminal, comprising:
a base band unit for controlling the mobile communication terminal;
a radio frequency ("RF") unit coupled with the base band unit and including an antenna, the RF unit for transceiving a first signal in response to a first control signal received from the base band unit;
a radio frequency identification ("RFID") unit coupled with the RF unit, the RFID unit for transceiving a second signal with a RFID transponder in response to a second control signal received from the base band unit,
wherein the first signal and the second signal are both transmitted and received through the antenna,
wherein the RF unit has a first position to transmit the first signal from the antenna to the base band unit, and a second position to transmit the second signal from the antenna to the RFID unit, and the first position and the second position are in response to a third control signal from the base band unit.

2. The mobile communication terminal of claim 1, wherein the first signal represents voice communications or data communications.

3. The mobile communication terminal of claim 1, wherein the RF unit comprises:
   an RF transception unit for transceiving the first signal;
   an antenna switch module coupled with the antenna;
   a path selection unit including a switch;
   a RFID transmission selection unit for transmitting one of the first signal and the second signal to the antenna; and
   a high output amplification unit for amplifying the first signal and the second signal.

4. The mobile communication terminal of claim 3, wherein the RF unit further comprises a filter coupled between the antenna switch module and the base band unit.

5. The mobile communication terminal of claim 3, wherein the RFID transmission selection unit comprises a switching device for selecting to transmit the first signal or the second signal to the antenna.

6. The mobile communication terminal of claim 3, wherein the RF transception unit is turned off when the RFID transmission selection unit transmits the second signal.

7. The mobile communication terminal of claim 3, wherein the RFID unit comprises:
   a RFID reader control unit to encode and signal-process a transmission signal received from the base band unit, and to decode and signal-process a reception signal received from the path selection unit; and
   a RFID RF unit to convert a frequency of the transmission signal and to output the transmission signal to the RFID transmission selection unit, and to convert a frequency of the reception signal and to output the reception signal to the RFID reader control unit.

8. The mobile communication terminal of claim 7, wherein the RFID RF unit comprises:
   a RFID transmission unit for modulating the transmission signal, for converting a frequency of the transmission signal, and for filtering and amplifying the transmission signal; and
   a RFID reception unit for filtering the reception signal, for amplifying the reception signal, and for converting a frequency of the reception signal.

9. The mobile communication terminal of claim 8, wherein the RFID transmission unit comprises:
   a modulator coupled with an output terminal of the RFID reader control unit;
   a first amplifier coupled with the modulator;
   a first filter coupled with the first amplifier;
   a second amplifier coupled with the first filter;
   a power division unit coupled with the second amplifier, the power division unit for dividing a voltage level of the transmission signal; and
   an attenuation unit coupled with the power division unit.

10. The mobile communication terminal of claim 9, wherein the modulator converts a frequency of the transmission signal from a lower frequency band to an ultra high frequency (UHF) band.

11. The mobile communication terminal of claim 8, wherein the RFID reception unit comprises:
    a filter for filtering the reception signal;
    a low noise amplifier coupled with the filter;
    a power division unit for dividing a voltage level of the reception signal; and
    a demodulator for demodulating the reception signal and for converting a frequency of the reception signal.

12. The mobile communication terminal of claim 11, wherein the demodulator converts a frequency of the reception signal from a higher frequency to a frequency band of the RFID reader control unit.

13. A mobile communication terminal, comprising:
    a base band unit for controlling the mobile communication terminal;
    a radio frequency ("RF") unit coupled with the base band unit, the RF unit comprising:
      an antenna;
      a path selection unit; and
      an RFID transmission selection unit; and
    an RFID unit comprising an RFID transmission unit and an RFID receiving unit,
    wherein an output terminal of the RFID transmission unit is coupled with an input terminal of the RFID transmission selection unit, an input terminal of the RFID receiving unit is coupled with an output terminal of the path selection unit, and the mobile communication terminal transceives a signal from the RF unit and a signal from the RFID unit using a cellular communication protocol through the antenna.

14. The mobile communication terminal of claim 13, wherein the cellular communication protocol comprises a GSM-based protocol.

15. The mobile communication terminal of claim 13, wherein the cellular communication protocol comprises a protocol used to transmit information signals between the mobile communication terminal and an asynchronous core network.

* * * * *